W. R. MORSE.
NUT LOCK.
APPLICATION FILED MAR. 4, 1912.

1,068,001.

Patented July 22, 1913.

Witnesses:
Floyd O. Chaffee
Edmund Hausold

Inventor
W. R. Morse

UNITED STATES PATENT OFFICE.

WILLIAM R. MORSE, OF LOS ANGELES, CALIFORNIA.

NUT-LOCK.

1,068,001.

Specification of Letters Patent. Patented July 22, 1913.

Application filed March 4, 1912. Serial No. 681,607.

*To all whom it may concern:*

Be it known that I, WILLIAM R. MORSE, a citizen of the United States, and resident of Los Angeles, in the county of Los Angeles and State of California, have invented certain new and useful Improvements in Nut-Locks, of which the following is a specification.

My invention pertains to nut-locks, and it has special reference to a lock for railway rails, but in its general application it may be used for any mechanism where bolts are employed.

In general the lock comprises a plate of any suitable size and of any gage metal, and, preferably of spring steel, which is centrally provided with a hole for the bolt, and along two opposite sides of the bolt hole is an L-shaped slit, from which the body of the metal is bent out to form a rib along the margin, this rib being so located and arranged with reference to the nut, that, when the nut is screwed in, the inclined surface of the rib will permit the nut to turn but when the nut turns back the edge of the rib will engage with the side of the nut and thus prevent it from unscrewing, as will now be set forth in detail.

Figure 1:
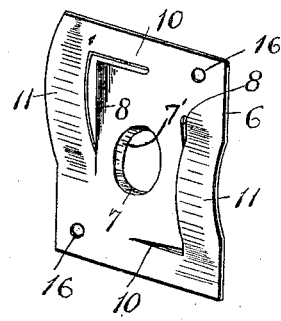
Figure 2:
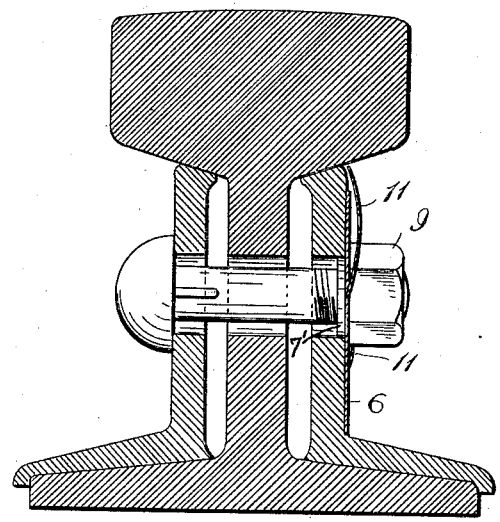
Figure 3:
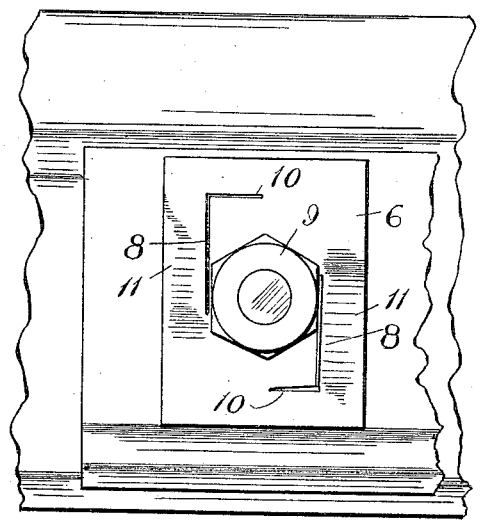
Figure 4:
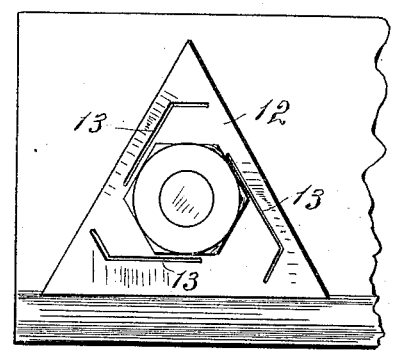
Figure 5:
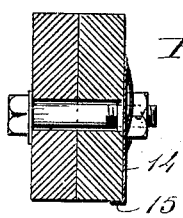

In the accompanying drawing, Figure 1, is a perspective view of my improved nut-locking plate. Fig. 2 is a cross section of a rail and fish plate together with the locking plate in position. Fig. 3, is a side view of a rail and fish plate showing the nut in its locked position and the locking plate. Fig. 4, is a side view showing modified form of locking plate, and Fig. 5, is a cross section of a pair of members secured by a bolt and the nut locked by my improved nut lock.

In constructing my invention I prepare a plate, preferably square, as shown at 6, provided centrally with a bolt hole 7, along each side of the bolt hole, is an L-shaped slit, the long limb 8 of the slit being such distance from the bolt hole as to be a little beyond the side of the nut 9, when the latter is in position, as shown, for instance, in Fig. 3. The short limb 10, of the slit projects over in the direction of the bolt hole, as shown. This plate is preferably made of sheet steel, and in the operation of blanking and forming the body of the plate, between the long slit 8 and the margin of the plate is forced forward to form a rib 11, so that it is normally above the plane of the plate.

As the end of the slit 8, opposite to the end which forms the juncture with the short slit 10, extends only a short distance past the bolt hole, it is obvious that the curved rib is thus drawn out at a point above a horizontal line extending through the bolt hole, hence when the nut is applied and screwed down the nut will ride over the end of the curved rib, and the rib will not offer any appreciable resistance to the nut. When, however, the nut is turned back, as in unscrewing the same, the side of the nut will engage with the ribs thus drawn out, and prevent the nut from unscrewing unless or until the ribs 11 are forced down flat so as to permit the corners of the nut to ride over the obstructions thus made.

It is obvious that I may make the locking plate in other forms as shown, for instance, in Fig. 4, in which the plate 12 is triangular, and is provided with a central bolt hole. In this instance I show three L-shaped slits 13, adapted to have rib-formations similar to the form shown in Fig. 1.

In case the lock should be required for any uses in machinery the plate may be arranged as to size and proportion to enable it to be applied, as, for instance, in Fig. 5, where one margin of the locking plate 14, has a right-angled flange 15, so as to form a means of engaging the plate with the locked members and thus prevent the plate from turning.

The plate may be provided with one or more holes 16, so that the plate may be applied to a wooden member, since a nail or nails may be driven through these holes to prevent the plate from turning.

The bolt hole 7 has an inturned flange 7', the object of which is to prevent the edge of the plate from entering or engaging with the threaded portion of the bolt, as the plate of which the lock is formed is usually made of thin metal, and should the edge of the plate enter the threaded portion of the bolt it might displace it laterally a sufficient distance to prevent the ribs 11 or the edges thereof from properly contacting with the side of the nut.

What I claim as new, is:

1. In a nut lock, a bolt and a nut therefor, a resilient plate, having a bolt hole, one or more slits tangentially disposed, relative to the bolt hole, the slots terminating within the margins of the plate and the portion of the plate outside the slit being curved outwardly to form a rib, and in such position that the side of the nut will engage with the rib to prevent said nut from turning in one direction, and when said nut is turned in the other direction it will ride over the curved rib.

2. In a nut-lock, a bolt, and a nut therefor, a resilient plate, having a bolt hole, one or more L-shaped slits in said plate, the long limb of each slit being positioned adjacent the bolt, and the end of the slit terminating near the bolt hole, and the end which joins the short limb being a greater distance from the bolt hole than the other end of the slit, the portion of the metal between each long slit and the margin of the plate being bent outwardly to form a rib normally above the plane of the plate.

Signed at the city of Los Angeles, county of Los Angeles, State of California, this 24th day of February 1912, in the presence of witnesses.

WILLIAM R. MORSE.

Witnesses:
EDMUND KASOLD,
J. S. ZERBE.

Copies of this patent may be obtained for five cents each, by addressing the "Commissioner of Patents, Washington, D. C."